United States Patent Office 3,455,816
Patented July 15, 1969

3,455,816
STRIPPING OF QUATERNARY AMMONIUM NITRATES AND PROCESS OF REMOVING THE NITRATE ANION FROM AQUEOUS SOLUTIONS THEREOF
Ronald R. Swanson, New Hope, Minn., assignor to General Mills, Inc., a corporation of Delaware
No Drawing. Filed Apr. 3, 1967, Ser. No. 627,670
Int. Cl. B01d 11/04
U.S. Cl. 210—21          19 Claims

ABSTRACT OF THE DISCLOSURE

The nitrate anion is stripped from a quaternary ammonium cation by contacting a solution of a quaternary ammonium nitrate in a water-immiscible organic solvent with an aqueous acidic ferrous iron solution. The nitrate anion is removed from aqueous solutions thereof by contacting said solutions with a quaternary ammonium compound dissolved in a water-immiscible organic solvent and then the nitrate anion is stripped from the resulting quaternary ammonium nitrate by contacting the organic solvent solution of same with an aqueous acidic ferrous iron solution.

The present invention relates to a process of removing the nitrate anion from aqueous solutions containing same with a quaternary ammonium compound. It also relates to a process of stripping the nitrate anion from the quaternary ammonium compound.

Many industrial processes yield water soluble nitrates as by-products. One fairly common practice of disposing of various wastes including such water soluble nitrates is to discharge them into adjoining lakes and streams. This has resulted in pollution of the natural bodies of water. In recent years various governmental and private organizations have attempted to reduce or eliminate these practices by various means. One way is to completely stop the industrial concerns and others from discharging waste materials into the natural bodies of water. Another way is to force the offenders into removing various detrimental materials from the waste streams prior to their discharge.

Liquid ion exchange has been used for the removal of certain anions, such as the anions of synthetic sulfonates and sulfates, from wastes, particularly those discharged from sewage treatment plants. Many of the sulfonates and sulfates are not biodegradable and thus are not ordinarily affected by most of the modern sewage treatment facilities. In carrying out these processes, the waste solution containing the anionic detergent is contacted with a liquid organic phase which contains an ion exchanger, such as an amine or quaternary ammonium compound. The detergent anion complexes with the ion exchanger and is thus transferred into the organic phase. The organic phase is then stripped to remove the detergent anion and regenerate the ion exchanger.

In order to make such a removal process economically attractive, the complexed anion must be capable of being stripped from the ion exchanger so that the same can be continuously recycled for further use. Anionic detergents can be efficiently extracted and the resulting complex can be readily stripped. Such is not the case with the nitrate anion.

It is known that the nitrate anion can be complexed with quaternary ammonium compounds to form quaternary ammonium nitrates. However, to the best of my knowledge there is no effective and/or economical way to strip the nitrate from the quaternary and thus regenerate same for further use. In this respect, the nitrate anion can be stripped by contacting the quaternary ammonium nitrate with an aqueous phase containing the perchlorate anion. However, this converts the quaternary to the quaternary ammonium perchlorate and the perchlorate anion is even more tightly held than the nitrate. Thus, while the nitrate is removed, the quaternary is not regenerated in a form which is useful for further liquid ion exchange work.

The nitrate ion can also be stripped by mass action. Thus the quaternary ammonium nitrate can be contacted with aqueous solutions containing large excesses of anions having less affinity for the quaternary cation. However, this is not practical since it is very wasteful of the stripping agent. It might also be possible to contact the quaternary ammonium nitrate with something that would precipitate the nitrate anion. But agents which form insoluble nitrate systems are unfortunately very uncommon.

I have now discovered that the nitrate anion can be removed from the quaternary by converting it to a non-nitrate nitrogen compound. This is accomplished by contacting the quaternary ammonium nitrate with an aqueous acidic ferrous iron solution. While I do not wish to be bound by the following, it is believed that the acid ferrous iron solution reduces the nitrate anion to nitric oxide and then complexes with the nitric oxide. The nitrate anion is thus removed from the organic phase thereby regenerating the quaternary for reuse. My invention also resides in the process of removing the nitrate anion from aqueous solutions thereof with a water immiscible organic solvent solution of a quaternary ammonium compound wherein the anion has less affinity for the quaternary cation than the nitrate, separating the organic phase from the aqueous phase and stripping the organic phase by contacting same with the aqueous acidic ferrous iron solution. The organic phase can then be recycled to contact further quantities of aqueous solutions containing nitrate anions. And of course, this process can be carried out continuously.

Any of a wide variety of oil soluble quaternary ammonium compounds can be used in the contacting of the aqueous nitrate anion containing solutions. Specific examples of such liquid ion exchange compounds useful in the present invention are lauryltrimethyl ammonium chloride, myristyltrimethyl ammonium chloride, palmityltrimethyl ammonium chloride, lauryltrimethyl ammonium sulfate, myristyltrimethyl ammonium bromide, palmityltrimethyl ammonium iodide, stearyltrimethyl ammonium chloride, stearyltrimethyl ammonium sulfate, oleyltrimethyl ammonium chloride, linoleyltrimethyl ammonium chloride, oleylbutyldimethyl ammonium sulfate, dilauryldimethyl ammonium chloride, dilauryldimethyl ammonium sulfate, dimyristyldimethyl ammonium chloride, dipalmityldimethyl ammonium chloride, distearyldimethyl ammonium chloride, distearyldimethyl ammonium sulfate, dioleyldimethyl ammonium bromide, dilinoleyldimethyl ammonium chloride, trilaurylmethyl ammonium chloride, trioctylmethyl ammonium bromide, tridecylmethyl ammonium chloride, stearylbenzyldimethyl ammonium sulfate, oleylbenzyldiethyl ammonium chloride, N-trimethyl-N'-dimethylstearyl propylene diammonium dichloride, and N-trimethyl-N'-dimethyl tallow propylene diammonium dichloride. These preferred compounds are represented by the formulas:

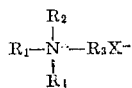

and

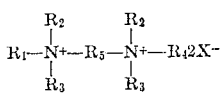

where $R_1$ is a hydrocarbon radical (aliphatic, alicyclic or aromatic) of 6 to 24 carbon atoms, $R_2$, $R_3$ and $R_4$ are hydrocarbon radicals of 1 to 24 carbon atoms, $R_5$ is a divalent hydrocarbon radical of 2 to 44 carbon atoms and X is an inorganic or organic salt forming anion having less affinity for the quaternary cation than the nitrate anion. Representative anions $X^-$ are chloride, bromide, iodide, sulfate, carbonate, phosphate, sulfite, hydroxide, cyanide, acetate and the like.

The oil soluble quaternary ammonium compound is dissolved in a water-immiscible organic solvent prior to the contacting of same with the aqueous nitrate containing solution. The term "water-immiscible organic solvent" as used herein refers to an organic material normally liquid at ambient temperatures which is substantially, but not necessarily entirely, insoluble in water. The term "oil soluble" as used herein with reference to the quaternary ammonium compound means that the quaternary is soluble in the organic solvent to at least an extent as to provide significant ion exchange properties.

The preferred organic solvents for the process of the present invention are the hydrocarbons. Examples of suitable hydrocarbon solvents include isooctane, kerosene, "Soltrol 170" (a commercially available naphthenic hydrocarbon solvent), benzene, toluene, xylene, isodecane, fuel oils, mineral oils, hexane, heptane, octane, "Panasols" (commercially available petroleum aromatic solvents) and the like. Solvents which contain functional groups can also be employed in the present invention providing that the functional groups do not adversely affect the extraction. Illustrative of such compounds are the alcohols, aldehydes, ketones, and esters such as naturally occurring vegetable oils. Chlorinated hydrocarbons such as carbon tetrachloride are also useful in the present process.

The first step in the removal process involves the contacting of the aqueous nitrate anion containing solution with the organic phase comprising the water-immiscible organic solvent and the oil soluble quaternary ammonium compound. The volume phase ratio of the aqueous phase to the organic phase can vary widely depending on the concentrations, conditions, etc. The phase ratio will preferably be in the range of aqueous to organic of about 1:10 to 500,000:1 and more preferably in the range of about 1:5 to 100:1. The amount of the quaternary ammonium compound in the organic phase also can be varied over wide limits but is preferably in the range of about 1.0 to 50.0 wt. percent. The phase ratio and concentration of the quaternary will, of course, be adjusted so that at least a portion of the nitrate anions are transferred from the aqueous phase to the organic phase during the contacting step. Ideally, all or substantially all of such nitrate anions will be transferred leaving a nitrate anion barren aqueous phase. The aqueous and organic phases are preferably agitated during the contacting step.

The organic and aqueous phases are then separated by virtue of their immiscibility, such as by decantation, the use of separatory funnels and the like. The separated organic phase containing the quaternary ammonium nitrate is then treated in accordance with the present invention with an aqueous acidic ferrous iron solution. It is, of course, understood that liquid organic solutions of quaternary ammonium nitrates obtained from any source may be treated with the aqueous acidic ferrous iron solution.

A preferred aqueous acidic ferrous iron solution is obtained using sulfuric acid as the acidifier. The ferrous ions are preferably supplied by stable salts or prepared in situ. One such preferred salt is ferrous ammonium sulfate having the formula $Fe(NH_4)_2(SO_4)_2 \cdot 6H_2O$. A preferred method of forming the ferrous ions in situ is to treat iron, such as scrap iron, with aqueous sulfuric acid to yield an acidic solution containing ferrous sulfate. Additionally, the treating step may be carried out with the aqueous phase being in contact with the iron. This tends to insure an adequate supply of ferrous ions in the aqueous treating solution according to the equation: $2Fe^{+3} + Fe^0 \rightarrow 3Fe^{+2}$.

The volume phase ratios of the organic phase to aqueous acidic ferrous ion phase can vary over wide limits. However, it is preferred to use phase ratios of organic to aqueous in the range of about 10:1 to 1:10. And the aqueous phase preferably contains a sufficient amount of ferrous ions to produce substantially all or all of the nitrate anions of the quaternary to nitric oxide. This amount will vary in accordance with the amount of quaternary ammonium nitrate in the organic phase and the amount of such organic phase. While I do not wish to be bound by the following, it is believed that the reaction proceeds as follows using the preferred sulfuric acid containing aqueous phase:

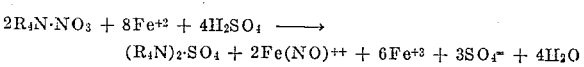

where R is the organic group or groups of the quaternary cation.

After completion of the above contacting step, the organic phase is separated from the aqueous phase. The organic phase can then be recycled for contacting further quantities of aqueous nitrate anion containing solutions. The aqueous phase can be discarded. However, in one preferred embodiment, the aqueous phase can be treated and reused for stripping. Thus the said stripping solution, when made up using sulfuric acid as the acidifier and ferrous ammonium sulfate, contains after the contacting step a black complex believed to include the cation $Fe(NO)^{++}$ which is relatively unstable. When such solution is aerated, the complex apparently breaks down and oxides of nitrogen are given off. After the aeration, the acid and ferrous ion concentrations can be adjusted where necessary, such as by passing the same over scrap iron, and the resulting solution can be reused for stripping nitrate anion from the quaternary ammonium nitrate.

The removal process of the present invention can be carried out in a continuous counter-current mixer-settler unit. Thus a stream of aqueous nitrate anion containing solution can be continuously contacted with a stream of the solution of the quaternary ammonium compound in the water-immiscible organic solvent, the two phases can be continuously separated, the organic phase can be continuously stripped with aqueous acidic ferrous iron solution, the two phases can be continuously separated, and the stripped organic phase can be continuously recycled for contacting further quantities of aqueous nitrate anion containing solution. Fresh or treated aqueous acidic ferrous iron solution can be continuously supplied to the stripping area of the process.

The invention is further described by the following example which is illustrative only and does not constitute a limitation on the invention.

EXAMPLE

A 5% by weight aqueous solution of NaNO₃ was contacted with an equal volume of 5% by weight solution of a trialkyl monomethyl ammonium chloride in kerosene. The alkyl groups of the quaternary were derived from coconut oil and contained 8 and 10 carbon atoms, such alkyl groups being randomly distributed in the quaternary cation. The contacting was performed in a separatory funnel at ambient temperature. The funnel was shaken to equilibrate the mixtures and then the phases were allowed to separate. The separated aqueous phase was substantially barren of nitrate anion and gave a positive chloride test. It was discarded.

The organic phase (about 50 ml.) was divided into about equal volumes between two separatory funnels. 15 ml. of a 5% by weight aqueous solution of ferrous ammonium sulfate (Fe(NH₄)₂(SO₄)₂·6H₂O) and about 5 ml. of 36 N H₂SO₄ were added to the first funnel and the funnel was shaken. The aqueous phase became black indicating the presence of Fe(NO)⁺⁺. The aqueous and organic phases were separated. The organic phase was substantially barren of the nitrate anion and contained trialkyl monomethyl ammonium sulfate. The aqueous phase was aerated at room temperature. The black color was discharged and oxides of nitrogen were detected in the effluent gas.

In contrast, the organic phase in the second separatory funnel was contacted with 15 ml. H₂O and 5 ml. 36 N H₂SO₄ (same acid content as the ferrous ammonium sulfate solution used in contacting the organic phase in the first separatory funnel). After the two phases were mixed by shaking and allowed to separate, a sample of the aqueous phase was checked for nitrate anion. A barely positive test was found indicating that almost no nitrate had been stripped by the sulfuric acid.

The embodiments of the invention in which an exclusive property or privilege is claimed are defined as follows:

1. A process of stripping the nitrate anion from a quaternary ammonium nitrate which comprises contacting a solution of the quaternary ammonium nitrate in a water-immiscible organic solvent with an aqueous acidic ferrous iron solution.

2. The process of claim 1 wherein the aqueous acidic ferrous iron solution is obtained by treating iron with an aqueous solution of sulfuric acid.

3. The process of claim 1 wherein the stripping is carried out while the aqueous acidic ferrous iron solution is in contact with iron metal.

4. The process of claim 1 wherein the water-immiscible organic solvent contains about 1 to 50% by weight of the quaternary ammonium nitrate.

5. The process of claim 1 wherein the water-immiscible organic solvent is kerosene, the kerosene contains about 1 to 50% by weight of the quaternary ammonium nitrate, the quaternary ammonium cation is selected from the group consisting of those having the formulae:

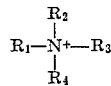

and

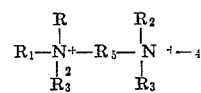

where $R_1$ is a hydrocarbon radical of 6 to 24 carbon atoms, $R_2$, $R_3$ and $R_4$ are hydrocarbon radicals of 1 to 24 carbon atoms and $R_5$ is a divalent hydrocarbon radical of 2 to 44 carbon atoms, the aqueous acidic ferrous iron solution is an aqueous solution of sulfuric acid and ferrous ammonium sulfate, the volume phase ratio of the organic phase to the aqueous phase is in the range of about 10:1 to 1:10, and the aqueous phase contains a sufficient amount of ferrous ions to reduce substantially all of the nitrate anions of the quaternary.

6. The process of claim 1 wherein the acid employed in the aqueous acidic ferrous iron solution is sulfuric acid.

7. The process of claim 6 wherein the ferrous iron is supplied by a stable, water soluble ferrous salt.

8. The process of claim 7 wherein the salt is ferrous ammonium sulfate.

9. A process for removing nitrate anions from an aqueous solution containing same which comprises: contacting the aqueous solution with a solution of an oil soluble quaternary ammonium compound in a water-immiscible organic solvent, the anion of the quaternary ammonium compound having less affinity for the quaternary ammonium cation than the nitrate anion; separating the organic phase from the aqueous phase; and contacting the organic phase containing oil soluble quaternary ammonium nitrate with an aqueous acidic ferrous iron stripping solution.

10. The process of claim 9 wherein the aqueous stripping solution is separated from the organic phase and the organic phase is continuously recycled for contacting further quantities of aqueous nitrate anion containing solution.

11. The process of claim 9 wherein the aqueous acidic ferrous iron stripping solution is obtained by treating iron with an aqueous solution of sulfuric acid.

12. The process of claim 9 wherein the water-immiscible organic solvent contains about 1 to 50% by weight of the quaternary ammonium compound.

13. The process of claim 9 wherein the acid employed in the aqueous acidic ferrous iron stripping solution is sulfuric acid.

14. The process of claim 13 wherein the ferrous iron is supplied by ferrous ammonium sulfate.

15. The process of claim 9 wherein the quaternary ammonium compound is selected from the group consisting of those of the formulae:

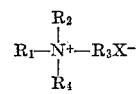

and

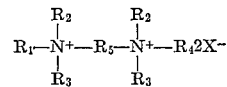

where $R_1$ is a hydrocarbon radical of 6 to 24 carbon atoms, $R_2$, $R_3$ and $R_4$ are hydrocarbon radicals of 1 to 24 carbon atoms, $R_5$ is a divalent hydrocarbon radical of 2 to 44 carbon atoms and $X^-$ is a salt forming anion having less affinity for the quaternary ammonium cation than the nitrate anion.

16. The process of claim 15 wherein the water-immiscible organic solvent is kerosene, the kerosene contains about 1 to 50% by weight of the quaternary ammonium compound, the quaternary ammonium compound is a trialkyl monomethyl ammonium chloride where the alkyl groups contain 8 and 10 carbon atoms, the volume phase ratio of the aqueous nitrate anion containing solution and the solution of the quaternary ammonium chloride is in the range of 1:5 to 100:1, the aqueous acidic ferrous iron solution is an aqueous solution of sulfuric acid and ferrous ammonium sulfate, the volume phase ratio of the organic phase containing the quaternary ammonium nitrate to the aqueous stripping solution is in the range of about 10:1 to 1:10, and the aqueous stripping solution contains a sufficient amount of ferrous ions to reduce substantially all of the nitrate anions of the quaternary.

17. The process of claim 16 wherein the aqueous stripping solution is separated from the organic phase and the organic phase is continuously recycled for contacting further quantities of aqueous nitrate anion containing solution.

18. The process of claim 17 wherein substantially all of the nitrate anions are removed from the aqueous nitrate anion containing solution.

19. The process of claim 18 wherein the separated aqueous stripping solution is aerated and then recycled for contacting further quantities of organic solution containing quaternary ammonium nitrate.

References Cited

UNITED STATES PATENTS

| | | | |
|---|---|---|---|
| 2,723,245 | 11/1955 | Wheaton | 210—32 X |
| 3,215,620 | 11/1965 | Dunning et al. | 210—37 X |
| 3,215,621 | 11/1965 | White et al. | 210—37 X |
| 3,259,568 | 7/1966 | Jordan et al. | 210—37 X |

REUBEN FRIEDMAN, Primary Examiner

FRANK A. SPEAR, JR., Assistant Examiner

U.S. Cl. X.R.

210—30, 34, 37